Jan. 11, 1944.   G. A. MATTHEWS   2,339,025
CIRCUIT PROTECTIVE EQUIPMENT
Filed Aug. 3, 1940
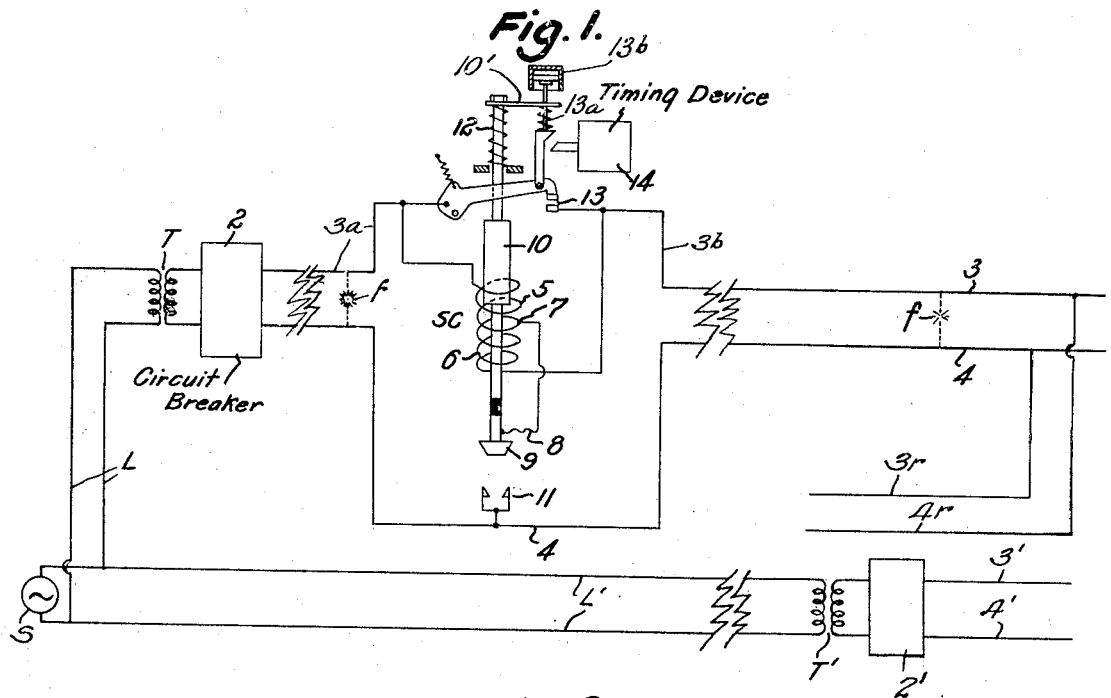
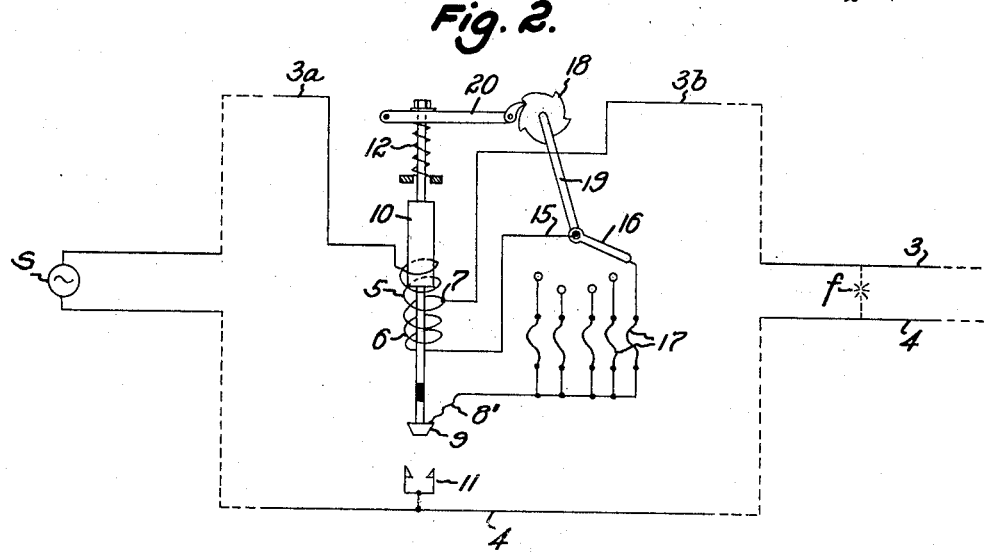
Inventor:
George A. Matthews,
By Potter, Pierce & Scheffler,
Attorneys.

Patented Jan. 11, 1944

2,339,025

UNITED STATES PATENT OFFICE 2,339,025

CIRCUIT PROTECTIVE EQUIPMENT

George A. Matthews, Detroit, Mich., assignor to The Detroit Edison Company, Detroit, Mich., a corporation of New York Application August 3, 1940, Serial No. 351,016

3 Claims. (Cl. 175—294)

This invention relates to circuit protective equipment and particularly to "line shorting contactors" and distribution systems including such shorting contactors for placing a metallic short circuit across a circuit upon the occurrence of a fault.

Electrical distribution systems that include line shorting contactors are described and claimed in my copending applications "Apparatus for protecting power lines," Ser. No. 333,875, filed May 7, 1940, and "Electrical distribution system," Ser. No. 351,015, filed Aug. 3, 1940, on which Patent No. 2,288,953 was granted on July 7, 1942. In general, a line shorting contactor comprises a switch, a spring for normally retaining the switch in open position, and an operating winding in series in the circuit for closing the switch upon abnormally high current flow. The design of the winding is such that the switch closes in the order of ½ cycle, on a 60 cycles per second basis, to clear transient faults from the circuit and thereby prevent burndown or objectionable damage to the line conductors.

Line shorting contactors such as described in my prior applications operate satisfactorily so long as the current source and the load circuit retain a particular relationship to the line shorting contactor, but do not function properly upon a reversal of the relative locations of the current source and the load. This condition of a reversal of the direction of power flow through the line shorting contactor may arise when the line shorting contactor is located at some distance from the normal current supply connection and the load circuit is temporarily connected to a power source other than its normal supply. In emergencies or as a part of normal inspection, the jumpering connections to a distribution circuit may be made at a considerable distance out on the circuit with the result that the source feed to the series coil of the line shorting contactor is reversed.

An object of the present invention is to provide distribution systems including line shorting contactors whose operating characteristics are substantially independent of the direction of power flow through the operating windings. An object is to provide line shorting contactors having tapped operating windings for connection to the movable contact and in series with the circuit in such manner that a short circuit current flows through a part or all of the winding to hold the contactor closed whether the initial fault was at one side or the other of the shorting contactor.

These and other objects and advantages of the invention will be apparent from the following specifications when taken with the accompanying drawing in which:

Figs. 1 and 2 are fragmentary diagrams of electrical distribution circuits including embodiments of the invention.

The protective system of the Fig. 1 circuit is of the general type that is described in detail in my copending application Ser. No. 333,875, and, as normally operated, the direction of power flow from a current source S and high voltage line L is through a transformer T, the reclosing circuit breaker 2, and the line shorting contactor SC, to the conductors 3, 4 of a distribution circuit. The physical construction of the line shorting contactor may be, except as to the operating winding, substantially as illustrated and described in detail in my prior application.

According to this invention, the operating winding comprises the sections 5, 6 at the opposite sides of a center tap 7 on a coil of heavy wire or copper bar, the outer terminals of the coil being connected to sections 3a, 3b of the conductor 3 at the normal source and normal load side, respectively, of the line shorting contactor. The center point 7 of the winding is connected by flexible lead 8 to the contact 9 that is carried by and insulated from the armature or magnetic plunger 10. The stationary contact 11 is connected to the other conductor 4 of the distribution circuit. The plunger is held in raised position by the spring 12 so long as the current flow through windings 5, 6 remains within normal load limits.

The normally open contacts of a lockout switch 13 are connected between the conductor sections 3a, 3b, i. e. across the operating winding 5, 6, and a timing device or escapement mechanism 14 locks the switch 13 in closed position for a predetermined interval, for example three minutes, when switch 13 is closed after a closure and reopening of the contacts 9, 11 of the shorting contactor. As shown schematically, the delayed closing of the lockout switch 13 may be effected by securing to the plunger 10 an arm 10' that compresses a spring 13a to close the switch 13 after a short time delay determined by the dashpot 13b. The specific constructions of the timing device and of the mechanism for closing the lockout switch 13 are not essential features of this invention and reference is made to application Ser. No. 333,875 for a detailed description of appropriate mechanism.

The method of operation of the protective system is as follows. Assuming a fault $f$ on the circuit 3, 4, the flow of fault current through windings 5, 6 results in a closure of contacts 9, 11 to short circuit the conductors 3, 4. Under normal conditions, the circuit 3, 4 is fed from the source S and the transformer T, and the short circuit current flow is therefore through the circuit breaker 2, conductor 3a, winding 5, contacts 9 and 11, and conductor 4 back to transformer T. The circuit breaker opens as a result of the heavy short circuit current flow, and spring 12 opens the shorting contactor upon this interruption of the current flow to winding 5. The lockout switch 13 closes, as described after the opening of the shorting contactor and is locked out to permit the completion of a cycle of operations of the circuit breaker 2 to a lockout in the case of permanent faults.

It is assumed that the distribution system may be isolated from the feeder line L by tripping the circuit breaker 2 and opening disconnect switches, not shown, and may then be energized by jumper connections between some remote section 3r, 4r of the distribution system and the feeder line 3', 4' of another distribution network that is supplied from another current source, or from the same source S and a high voltage line L', through a transformer T' and circuit breaker 2'. The direction of power supply to the distribution line 3, 4 is thus reversed during the temporary operation of the system through the circuit breaker 2', and the line shorting contactor SC does not function in the event of a fault $f$ on a section of line 3, 4 between the line shorting contactor and the temporary power supply connection to the line 3', 4'. In the event of a fault $f'$ across conductors 3a, 4 at the normal power supply side of the line shorting contactor SC the fault current flows through windings 5, 6 in series to close the shorting contactor, and the short circuit current flows through winding 6 to hold it in closed position until the voltage is removed from the line by the opening of the circuit breaker 2' associated with the other current supply. The operation is thus different from that of the shorting contactor, as described in my prior applications, in which the movable contact 9 and conductor 3b were connected to the lower terminal of a single section winding. The short circuit current in that case did not flow through the single section winding when the current source was across conductors 3b, 4, and the shorting contactor therefore opened immediately upon a closure due to a fault, thus preventing operation of the relatively slow-acting circuit breaker and drawing an arc between the contacts 9, 11.

The protective equipment of the Fig. 2 circuit is of the general type disclosed in the latter of my copending applications and includes, in series with the contacts 9, 11 of the shorting contactor, a bus short interrupter that may be an oil circuit breaker or, as illustrated, a repeating fuse assembly. The windings 5, 6 and general structure of the shorting contactor are, or may be, substantially as previously described but the lockout switch 13 is omitted.

Only the winding 5 is connected between the conductors 3a, 3b in this embodiment of the invention, and the outer terminal of the winding 6 is connected by a lead 15 to the contact arm 16 of a fuse selector switch. A series of fuses 17 are connected between the several switch points and the jumper 8' to the movable contact 9 of the shorting contactor. The contact arm 16 of the selector switch is advanced one step, to connect another fuse 17 in circuit, upon each opening of the shorting contactor and, conversely, the contact arm is not advanced until the shorting contactor opens upon a clearing of the fault from the line.

The mechanism for coupling the selector switch to the moving system of the shorting contactor may be of any desired design and, as illustrated, comprises a pawl and ratchet mechanism 18, the ratchet wheel operating the contact arm 16 through a shaft 19 and the pawl being mounted on a lever arm 20 that moves with the plunger 10 of the shorting contactor.

It will be apparent that the fault current will flow through the operating winding 5 under the illustrated normal circuit conditions and also when the positions of the current source and load are reversed with respect to the shorting contactor. A fault $f$ between conductors 3, 4 therefore results in an operation of the shorting contactor and completes a shorting circuit through one of the fuses 17 and the contacts 9, 11. Under the assumed normal conditions, the short circuit current flows through windings 5 and 6, and holds the shorting contactor closed until the fuse 17 blows. With a temporary jumper connection to a remote point on the distribution system and a fault between the lines 3a, 4 at the normal input side of the line shorting contactor, the short circuit current flows only through the winding 6, and this winding may, if desired, be somewhat larger than winding 5 to develop a heavy force for the compression of the resetting spring 12. This will insure a quick opening of the shorting contactor in spite of the normal load current that flows through the winding 5 when the fault is removed from the line.

In the case of a transient fault, the shorting contactor operates in ½ cycle to apply a metallic short across the line, and opens immediately following the blowing of the first fuse in group 17. The return movement of the solenoid plunger as explained previously allows the selector switch to insert a new fuse of group 17 in the shorting circuit. If the fault is of the permanent type, the shorting contactor is held in the closed position by the flow of fault current in the line until the circuit is cleared by the blowing of a sectionalizing back-up fuse or circuit breaker. The shorting contactor then opens and advances the selector switch to connect another fuse 17 into the shorting circuit.

The protective equipment may include elements other than those herein shown and described without materially affecting the method of operation of the new line shorting contactors and it is therefore to be understood that various changes and modifications may be made without departing from the spirit of my invention as set forth in the following claims.

I claim:

1. In an electrical power system, the combination with a two wire distribution circuit having a normal power input point, a current source, and means including a circuit interrupter for connecting said current source to the normal power input point of the distribution circuit to establish a normal direction of power flow in said distribution circuit, a portion of said distribution circuit remote from said normal power supply point being located adjacent a current supply to which emergency connections may be made when said circuit interrupter is opened, the direction of power flow in said distribution circuit being reversed when said emergency connections are established, of means spaced from said normal power input point and responsive to fault current on said distribution circuit for short-circuiting the same; said means comprising a line shorting contactor having a pair of normally open contacts, an operating winding for said line shorting contactor having end terminals and an intermediate terminal, two of said terminals being serially connected in one conductor of said distribution circuit and the third terminal being connected to one of said contacts, the other contact being connected to the other conductor of said distribution circuit.

2. In an electrical power system, the invention as recited in claim 1, wherein the end terminals of said winding are connected in series in a conductor of the distribution circuit, and the intermediate terminal is connected to the movable contact of said pair.

3. In an electrical power system, the invention as recited in claim 1, wherein an end terminal and the intermediate terminal are connected in series in one conductor of the distribution circuit, and the other end terminal is connected to the movable contact of said pair.

GEORGE A. MATTHEWS.